United States Patent
Johann et al.

(10) Patent No.: US 10,118,841 B2
(45) Date of Patent: Nov. 6, 2018

(54) CARTRIDGE FOR THE TREATMENT OF DRINKING WATER AND METHOD FOR PURIFYING DRINKING WATER

(71) Applicant: BWT water+more GmbH, Mondsee (AT)

(72) Inventors: Juergen Johann, Nussloch (DE); Monique Bissen, Mondsee (AT)

(73) Assignee: BWT Water+more GmbH, Mondsee (AT)

( * ) Notice: Subject to any disclaimer, the term of this patent is extended or adjusted under 35 U.S.C. 154(b) by 0 days.

(21) Appl. No.: 14/388,640

(22) PCT Filed: Apr. 9, 2013

(86) PCT No.: PCT/EP2013/057397
§ 371 (c)(1),
(2) Date: Sep. 26, 2014

(87) PCT Pub. No.: WO2013/153068
PCT Pub. Date: Oct. 17, 2013

(65) Prior Publication Data
US 2015/0060366 A1    Mar. 5, 2015

(30) Foreign Application Priority Data
Apr. 12, 2012    (DE) .......... 10 2012 007 150

(51) Int. Cl.
*C02F 1/42*     (2006.01)
*B01J 47/026*   (2017.01)
(Continued)

(52) U.S. Cl.
CPC .............. *C02F 1/42* (2013.01); *B01J 39/05* (2017.01); *B01J 39/07* (2017.01); *B01J 47/012* (2017.01);
(Continued)

(58) Field of Classification Search
None
See application file for complete search history.

(56) References Cited

U.S. PATENT DOCUMENTS

| 2,906,716 A | 9/1959 | Hwa |
| 3,327,859 A | 6/1967 | Pall |

(Continued)

FOREIGN PATENT DOCUMENTS

| DE | 2608408 A1 | 11/1976 |
| DE | 2948795 A1 | 6/1980 |

(Continued)

OTHER PUBLICATIONS

"Related International Patent Application No. PCT/EP2013/057397", "International Preliminary Report on Patentability", dated Oct. 23, 2014, Publisher: PCT/IB WIPO, Published in: CH.

(Continued)

*Primary Examiner* — Michael H. Wilson
*Assistant Examiner* — Katherine A Will
(74) *Attorney, Agent, or Firm* — Kaplan Breyer Schwarz, LLP

(57) ABSTRACT

A cartridge for treating drinking water, the cartridge comprising a mixture of an ion-exchange material, one part of which is a highly acidic ion-exchange material and another part of which is a weakly acidic ion-exchange material, wherein one of the materials is loaded with alkali ions or alkaline earth ions.

10 Claims, 2 Drawing Sheets

(51) Int. Cl.
*C02F 1/00* (2006.01)
*B01J 47/024* (2017.01)
*B01J 47/04* (2006.01)
*B01J 39/05* (2017.01)
*B01J 39/07* (2017.01)
*B01J 47/012* (2017.01)
*C02F 1/68* (2006.01)
*C02F 101/10* (2006.01)

(52) U.S. Cl.
CPC .......... *B01J 47/024* (2013.01); *B01J 47/026* (2013.01); *B01J 47/04* (2013.01); *C02F 1/003* (2013.01); *C02F 1/68* (2013.01); *C02F 2001/425* (2013.01); *C02F 2101/10* (2013.01); *C02F 2201/006* (2013.01); *C02F 2307/04* (2013.01); *C02F 2307/10* (2013.01)

(56) References Cited

U.S. PATENT DOCUMENTS

| | | | |
|---|---|---|---|
| 4,198,296 | A | 4/1980 | Doumas et al. |
| 4,775,585 | A | 10/1988 | Hagiwara et al. |
| 5,215,657 | A | 6/1993 | Goldfield et al. |
| 9,932,249 | B2 | 4/2018 | Johann et al. |
| 2003/0168395 | A1 | 9/2003 | Maeno et al. |
| 2005/0056687 | A1 | 3/2005 | Matsumoto et al. |
| 2006/0246285 | A1* | 11/2006 | Schmidtbauer .... B01J 20/28004 428/365 |
| 2008/0087597 | A1* | 4/2008 | Johann ................... B01D 35/30 210/232 |
| 2010/0068343 | A1* | 3/2010 | Johann ................... C02F 1/003 426/66 |
| 2010/0263689 | A1* | 10/2010 | Monsrud ................ C02F 1/42 134/18 |
| 2014/0034579 | A1* | 2/2014 | Cagnoni ................ C02F 1/003 210/681 |
| 2015/0053618 | A1 | 2/2015 | Johann et al. |
| 2015/0060366 | A1 | 3/2015 | Johann et al. |
| 2015/0321188 | A1 | 11/2015 | Johann et al. |

FOREIGN PATENT DOCUMENTS

| | | | |
|---|---|---|---|
| DE | 3304152 | A1 | 8/1983 |
| DE | 4410874 | A1 | 10/1995 |
| DE | 19958648 | A1 | 6/2001 |
| DE | 10020437 | A1 | 11/2001 |
| DE | 10217649 | A1 | 1/2004 |
| DE | 10231096 | A1 | 1/2004 |
| DE | 102007033337 | A1 | 1/2009 |
| DE | 102007033339 | A1 | 1/2009 |
| DE | 102010023612 | A1 | 12/2010 |
| EP | 2022760 | A2 | 2/2009 |
| EP | 2094611 | B1 | 6/2010 |
| EP | 2263503 | A2 * | 12/2010 ............ A47J 31/605 |
| GB | 684848 | A | 12/1952 |
| JP | 10109088 | A | 4/1998 |
| JP | 2006231148 | A | 9/2006 |
| JP | 2012028159 | A | 2/2012 |
| WO | 2003085198 | A2 | 10/2003 |
| WO | 2004007374 | A1 | 1/2004 |
| WO | 2006095282 | A1 | 9/2006 |
| WO | 2011101483 | A1 | 8/2011 |
| WO | 2012107916 | A1 | 8/2012 |

OTHER PUBLICATIONS

"Parent Application in Germany No. DE 10 2012 007 150.7 ", "Office Action", dated Dec. 3, 2012, Publisher: DPTO, Published in: DE.

"Related International Application No. PCT/EP2013/057397", "International Search Report and Written Opinion", dated Jun. 11, 2013, Publisher: PCT/ISA, Published in: NL.

Related Application in Germany No. DE 10 2012 007 149.3, "Office Action", dated Nov. 28, 2012, Publisher: DPTO, Published in: DE.

Related German Patent Application No. DE 10 2012 007 149.3, "Office Action", dated Mar. 6, 2015, Published in: DE.

Related International Application No. PCT/EP2013/057398, "International Preliminary Report on Patentability", dated Oct. 23, 2014, Publisher: PCT/IB WIPO, Published in: CH.

Related International Application No. PCT/EP2013/057398, "International Search Report and Written Opinion", dated Jun. 11, 2013, Publisher: PCT/ISA, Published in: NL.

Machine language translation of JP10109088A (Matsukawa et al) obtained from the J-Plat Pat website on Dec. 28, 2016, 7 pages.

"Ex Parte Quayle Office Action" issued in related U.S. Appl. No. 14/388,657, dated Aug. 21, 2017.

"Office Action" issued in related U.S. Appl. No. 14/388,657, dated Sep. 6, 2016.

"Office Action" issued in related U.S. Appl. No. 14/388,657, dated Jan. 5, 2017.

"Office Action" issued in related U.S. Appl. No. 14/388,657, dated May 9, 2017.

Related Patent Application in Germany: DE 10 2012 105 723.0, "Office Action", dated Jan. 20, 2013, Publisher: DEPM, Published in: DE.

Related International Application No. PCT/EP2013/063686, "International Preliminary Report on Patentability", dated Jan. 8, 2015, Publisher: International Bureau of WIPO, Published in: CH.

Related International Application No. PCT/EP2013/063686, "International Search Report and Written Opinion", dated Aug. 19, 2013, Publisher: PCT/IB EPO, Published in: EP.

"Office Action" issued in related U.S. Appl. No. 14/140,135, dated Mar. 1, 2017.

"Office Action" issued in related U.S. Appl. No. 14/140,135, dated Jun. 26, 2017.

Non-Final Rejection dated May 16, 2018 for U.S. Appl. No. 14/410,135.

"Office Action" issued in related German patent application No. 1020120071493, dated Nov. 20, 2017.

"Notice of Allowance" dated Nov. 16, 2017 in related U.S. Appl. No. 14/388,657.

"Final Office Action" dated Nov. 30, 2017 in related U.S. Appl. No. 14/410,135.

* cited by examiner

CARTRIDGE FOR THE TREATMENT OF DRINKING WATER AND METHOD FOR PURIFYING DRINKING WATER

FIELD OF THE INVENTION

The invention relates to a cartridge for treating drinking water. The cartridge is in particular designed for a gravity-operated household water filter or as a disposable cartridge for insertion into the feeding conduit of a device for preparing beverages. The invention also relates to a method for treating drinking water.

BACKGROUND OF THE INVENTION

Cartridges, especially filter cartridges for treating drinking water are known. On the one hand, these are cartridges that are used in gravity-operated water filter systems, especially for household purposes. In this case, the cartridge is arranged in a hopper into which water is filled. Through an inlet, the water flows into the cartridge at an upper side thereof and leaves the bottom of the cartridge at a lower outlet. For other applications, in particular in gastronomy and for vending machines for preparing hot drinks such as coffee and tea, cartridges are known which are either inserted into a device or which have connections adapted to be connected into a drinking water conduit.

In Central Europe, such replaceable cartridges are mainly used to reduce the hardness of water, especially the carbonate hardness of drinking water. For this purpose, the cartridge is equipped with an ion-exchange material, mostly a weakly acidic resin which is disposed in a chamber in form of a granulated material. The use of such cartridges is especially intended to improve the taste of hot drinks, in particular it is possible to reduce the haziness in tea which is typical for hard water.

However, the generic cartridges for water treatment may furthermore have the task of removing suspended particles, germs, heavy metals, etc. from the water.

The cartridges are usually designed as a disposable system, i.e. they are discarded after the intended multiple use or supplied for reuse in a deposit system.

European patent EP 2094611 B1 (BWT International Trading Ltd.) discloses a method and a device for enriching water with magnesium ions. In particular, this patent discloses a cartridge for a gravity-operated household water filter, which contains a weakly acidic ion-exchange material which is partially loaded with hydrogen ions and partially with magnesium ions. This enables in a particularly simple manner to enrich the water with magnesium. At the same time, the acidification of the drinking water is reduced by the employed ion-exchange material loaded with magnesium ions.

OBJECT OF THE INVENTION

Given the above, the invention is based on the object to further improve known cartridges for treating drinking water. In particular it is intended to eliminate the need for a time-consuming and complex conditioning of an ion-exchange material with two ion species. Furthermore, the release of alkaline earth ions such as magnesium is enhanced, i.e. the exchange of alkaline earth ions is largely independent of the pH of the drinking water.

SUMMARY OF THE INVENTION

The object of the invention is already achieved by a cartridge for treating drinking water and by a method for treating drinking water in accordance with the illustrative embodiment of the present invention.

The invention relates to a cartridge for treating drinking water.

In particular, the invention relates to a cartridge for a gravity-operated household water filter, i.e. a system in which the cartridge is inserted into a hopper, into which the water is filled.

Such a cartridge generally includes a housing having an inlet and an outlet. Inlet and outlet are often formed as slots or as a grid structure.

The invention also relates to cartridges for use with devices for the preparation of beverages. In this case, the cartridge may be seated in the device, for example in the outlet of a water container or in the feed conduit of the device. Generally, a distinction is made between devices for preparing hot drinks such as coffee or tea, and devices for preparing cold drinks. In the latter devices, sweetener or sugar and flavorings are often added to the water. In carbonated beverages, an acidulation of the water is often desirable, whereas for the preparation of hot drinks a strong acidulation may be unfavorable.

The cartridge comprises an ion-exchange material which is in particular provided in form of a granulated material. A first part of the ion-exchange material is loaded with alkali ions or alkaline earth ions, in particular with magnesium ions, and a second part of the ion-exchange material is loaded with hydrogen ions. Instead of a granulated material, a non-woven fabric may be used as the ion-exchange material.

Weakly acidic and strongly acidic ion-exchange materials are combined in a chamber of the cartridge.

According to the invention, one of the two parts of the ion-exchange material is a highly acidic ion-exchange material, and the other part of the ion-exchange material is a weakly acidic ion-exchange material.

The inventor has found that when simultaneously using highly acidic and weakly acidic ion-exchange materials it is very easily possible to confection the ion-exchange material such that the properties of the filtered drinking water with respect to pH and composition can be adjusted.

Preferably, the weakly acidic ion-exchange material is predominantly loaded with other ions than the highly acidic ion-exchange material, at least in its delivery state.

The loading of the highly acidic part with alkali ions or alkaline earth ions results in an improved selectivity with respect to these ions and in an accelerated release in particular of alkaline earth ions such as magnesium, since the highly acidic ion exchanger exchanges them largely independently of the pH value. Ion exchange processes are equilibrium reactions, which causes that in particular with weakly acidic ion-exchange materials, the selectivity with respect to the individual ions species varies, depending on the composition of the drinking water to be treated. For example, in a drinking water with high concentrations of chloride, sulfate, or nitrate, this so-called permanent hardness is not replaced.

This means that the composition of the treated water will also vary, for example with regard to the concentration of magnesium ions, and may be outside a desired range depending on the water used.

When using a highly acidic ion-exchange material which is at least partially loaded with alkali ions or alkaline earth ions, the desired concentration of ions to be added to the water can be well controlled.

At the same time, a part of weakly acidic ion-exchange material predominantly loaded with hydrogen ions permits to reduce the water hardness, especially the carbonate hardness, without acidifying the water to an undesirable high level. This is accomplished in particular by the fact that the alkali ions or alkaline earth ions of the highly acidic part provide a sufficient buffer.

Another advantage is based on the fact that, as contemplated according to a preferred embodiment of the invention, a portion of the ion-exchange material is predominantly loaded with one ion species, preferably to at least 90%, in particular with hydrogen ions.

Thus, the relatively complex conditioning of an ion-exchange material, in particular of a weakly acidic ion-exchange material, with two ion species, such as magnesium and hydrogen ions, can be dispensed with.

The weakly acidic ion-exchange material used is in particular a cationic ion-exchange material having a carboxyl group. Such synthetic resin ion exchangers are marketed under the trade names Lewatit® or Amberlite®, for example.

The highly acidic ion-exchange material is preferably a cation exchanging material including sulfonic acid groups.

If now the highly acidic portion of the ion-exchange material is predominantly loaded with hydrogen ions, it is easily possible to deliberately acidify the water, in particular to a pH of less than 3, preferably less than 2.7.

It is in particular contemplated to use such acidulated water for soft drinks, especially those soft drinks which contain sweeteners or sugar in addition to flavorings.

In one embodiment of the invention, the highly acidic ion-exchange material is loaded with alkali ions or alkaline earth ions to at least 10%, preferably at least 60%, and more preferably at least 90% of its capacity.

Preferably, the highly acidic part is predominantly loaded with alkali ions or alkaline earth ions.

In the context of the invention, the determination of the percentage of capacity to which the ion-exchange material is loaded with a specific ion species, is made according to DIN 54403 of April 2009. According to the procedure of this standard, first the total capacity of the ion-exchange material is determined. The procedure is different depending on whether a highly acidic or weakly acidic ion exchanger is concerned. Weakly acidic ion exchangers are first converted into the hydrogen form. Once the total capacity has been determined, it can then be determined to which percentage of this capacity the ion exchanger is loaded with alkali ions or alkaline earth ions or another ion species.

In an alternative embodiment of the invention, which in particular serves to acidulate the water for preparing soft drinks, the highly acidic ion-exchange material is loaded with hydrogen ions to at least 30%, preferably at least 50%, and more preferably at least 80% of its capacity which is the total capacity according to DIN 54403.

In the context of the invention, the specified capacities always refer to the delivered state. It will be understood that for example the loading with hydrogen ions will decrease during the intended use of the cartridge.

Further, it is in particular contemplated that the first and second parts of the ion-exchange material is provided in a ratio (mass ratio) from 1:9 to 9:1, preferably from 3:7 to 7:3.

Preferably, the highly acidic and the weakly acidic ion-exchange materials are provided as a mixture of a granulated material which is filled into the chamber of the cartridge.

So it is possible to equip a commercial cartridge, in particular for gravity-operated household water filters, with a mixture of granulated material having the functionality described above in a particularly simple manner, without the employed resin has to be conditioned with two ion species in a complex way.

At the same time, if one ion-exchange material is loaded with magnesium ions, it is possible to adjust a more uniform release of magnesium ions over the useful life of the cartridge.

The invention further relates to a method for treating drinking water, in particular using a cartridge as described above.

The drinking water is passed through an ion-exchange material which comprises a mixture of a highly acidic ion-exchange material and a weakly acidic ion-exchange material. One of the ion-exchange materials is at least partially, preferably predominantly loaded with alkali ions or alkaline earth ions.

In one embodiment, the highly acidic ion-exchange material is predominantly loaded with hydrogen ions, and the water is acidified to a pH of less than 3, preferably less than 2.7, so that it can be used in particular for soft drinks.

The part of the ion-exchange material loaded with alkali ions or alkaline earth ions permits to provide an additional functionality, in particular the water can be enriched with magnesium.

In an alternative embodiment of the invention, the weakly acidic part of the ion-exchange material is predominantly loaded with hydrogen ions.

The highly acidic ion-exchange material is loaded with alkali ions or alkaline earth ions, in particular with magnesium ions, whereby the water is enriched with these ions.

At the same time, the pH value of the water may be adjusted such that it does not drop to a value of less than 3.5, preferably not to a value of less than 4.2.

DETAILED DESCRIPTION

The invention will now be explained in more detail by way of schematically illustrated exemplary embodiments with reference to the drawings of FIG. 1 and FIG. 2.

Figure 1:
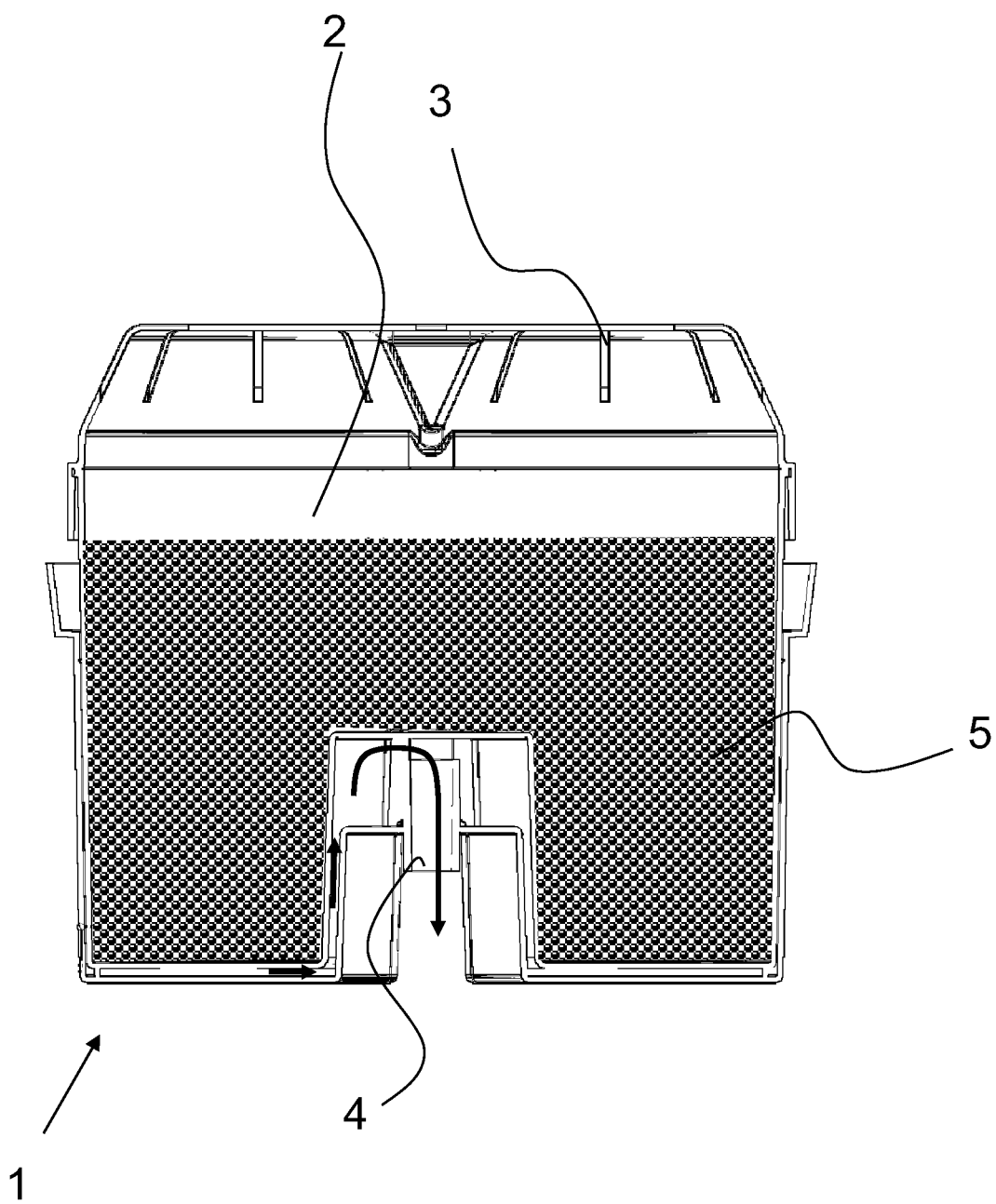
FIG. 1 is a sectional view of a cartridge for a gravity-operated household water filter.

FIG. 1 is a sectional view of a cartridge 1 for a gravity-operated household water filter such as it may be inserted into a hopper (not shown).

The basic principle of such a cartridge is known.

In the present exemplary embodiment, cartridge 1 is a cartridge with flow reversal in which the water to be treated enters via an inlet 3 into a chamber 2 which is filled with an ion-exchange material 5.

The ion-exchange material 5 is provided in granulated form.

In this exemplary embodiment, the bottom of the cartridge has no opening, rather the water leaves the cartridge 1, after flow reversal, through a tubular outlet 4 (the path of the water is marked by arrows).

However, it will be understood that the invention is also provided for cartridges without flow reversal, which in particular have an apertured cartridge bottom that serves as an outlet (not shown).

In this exemplary embodiment, the granulated material 5 is a mixture of a highly acidic ion-exchange material which in its delivered state is predominantly loaded with magnesium, and a weakly acidic ion-exchange material which in its delivered state is predominantly loaded with hydrogen.

In this manner, the drinking water to be treated can be enriched with magnesium ions. Furthermore, the acidification of the drinking water is reduced.

When compared to the conditioning of a material with two different ion species, this permits a simplified manufacturing.

The properties of the treated water with respect to pH and magnesium content can be adjusted through the ratio of weakly acidic granulate and highly acidic granulate used.

Figure 2:
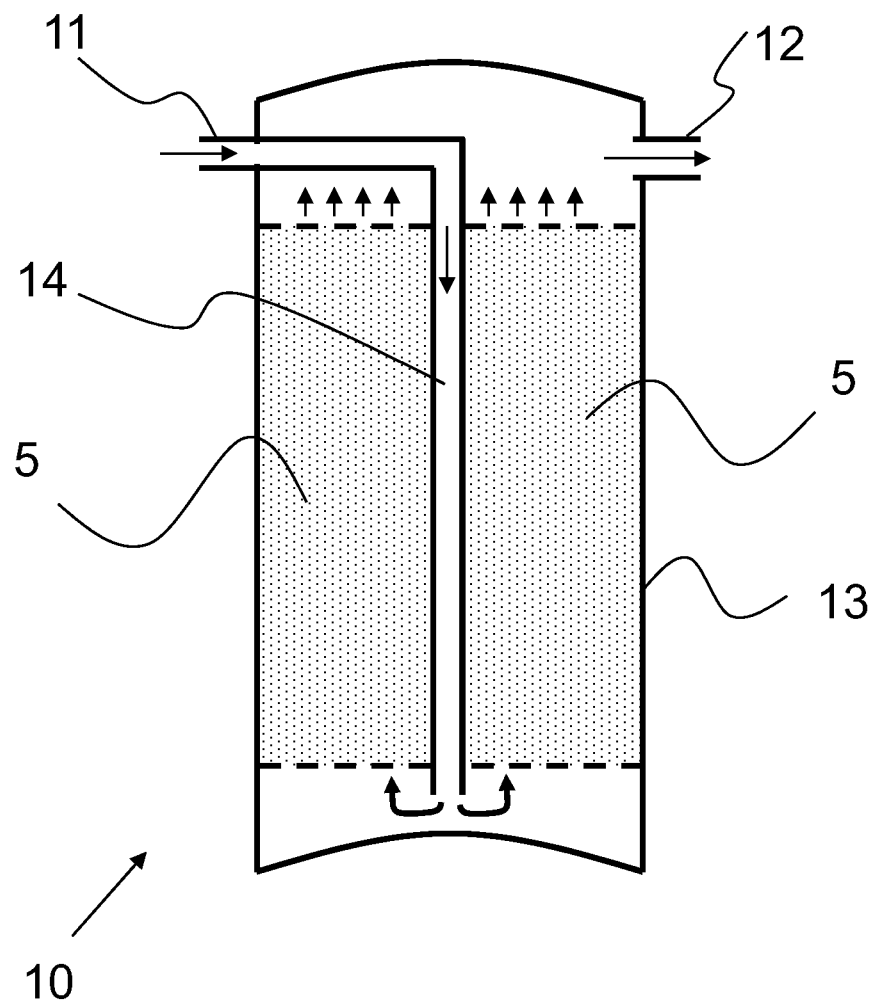
FIG. 2 shows an embodiment of a cartridge which is adapted for connection to a drinking water conduit.

FIG. 2 shows an embodiment of a cartridge 10 which is adapted for connection to a drinking water conduit, in particular to the conduit of a device for preparing hot beverages, such as used in gastronomy, for example.

Cartridge 10 comprises a housing 13 with a connection 11, through which water flows into the housing 13 of cartridge 10.

The treated drinking water leaves the cartridge via connection 12 and can be supplied for further use.

The path of the water is again indicated by arrows.

Inlet connection 11 is connected to a downpipe 14 through which the water to be treated is fed into the bottom of the housing 13 of cartridge 10.

The interior of cartridge 10 is filled with an ion-exchange material 5 which comprises a mixture of a granulate of a highly acidic ion-exchange material predominantly loaded with magnesium and a granulate of a weakly acidic ion-exchange material which is predominantly converted into the hydrogen form in its delivered state.

The water rising from the cartridge bottom due to the pressure of the following inflowing water rises in the housing and passes through the ion-exchange material 5 and exits cartridge 10 through outlet 12.

The invention permits to provide a cartridge which can be adapted in a very simple manner with respect to the desired properties of the treated drinking water. At the same time, the selectivity with respect to alkali ions and alkaline earth ions, in particular with respect to magnesium, is improved, which results in a more uniform release.

LIST OF REFERENCE NUMERALS

1 Cartridge
2 Chamber
3 Inlet
4 Outlet
5 Granulated material
10 Cartridge
11 Connection
12 Connection
13 Housing
14 Downpipe

What is claimed is:

1. A cartridge for treating drinking water, comprising:
at least one chamber including an ion-exchange material,
a first part of which is provided in form of a highly acidic ion-exchange material and in its delivered state predominantly loaded with alkaline earth ions, wherein the alkaline earth ions are predominantly magnesium ions, and
a second part of which is provided in form of a weakly acidic ion-exchange material and in its delivered state predominately loaded with hydrogen ions, wherein the highly acidic and the weakly acidic ion-exchange materials are combined in the chamber of the cartridge,
wherein the first part of the ion-exchange material is loaded with the alkaline earth ions to at least 60% of its capacity.

2. The cartridge for treating drinking water as claimed in claim 1, wherein the first and second parts of the ion-exchange material are provided in form of a mixed granulated material.

3. The cartridge for treating drinking water as claimed in claim 1, wherein the first and second parts of the ion-exchange material are provided in form of ion-exchange non-woven fabrics.

4. The cartridge for treating drinking water as claimed in claim 1, wherein the first and second parts of the ion-exchange material are provided in a ratio from 1:9 to 9:1.

5. The cartridge for treating drinking water as claimed in claim 1, wherein the cartridge is adapted for use in a gravity-operated household water filter, and wherein the cartridge includes a housing having an inlet and an outlet such that the cartridge is insertable into a hopper into which water can be filled.

6. The cartridge for treating drinking water as claimed in claim 1, wherein said first part is loaded with magnesium ions.

7. A method for treating drinking water using a cartridge for treating drinking water, the cartridge having at least one chamber including an ion-exchange material, a first part of which is provided in form of a highly acidic ion-exchange material and in its delivered state predominantly loaded with alkaline earth ions, wherein the alkaline earth ions are predominantly magnesium ions, and a second part of which is provided in form of a weakly acidic ion-exchange material and in its delivered state predominately loaded with hydrogen ions, wherein the highly acidic and the weakly acidic ion-exchange materials are combined in the chamber of the cartridge, the method comprising:
passing the drinking water through an ion-exchange material which comprises a mixture of a highly acidic ion-exchange material and a weakly acidic ion-exchange material, wherein one of the highly acidic ion-exchange material or the weakly acidic ion-exchange material is at least partially loaded with alkaline earth ions, wherein the alkaline earth ions are predominantly magnesium ions, wherein the highly acidic ion-exchange material is loaded with hydrogen ions, and wherein the drinking water is acidified to a pH of less than 3.

8. A cartridge for treating drinking water, comprising:
at least one chamber including an ion-exchange material,
a first part of which is provided in form of a highly acidic ion-exchange material and in its delivered state predominantly loaded with hydrogen ions, and
a second part of which is provided in form of a weakly acidic ion-exchange material and in its delivered state is predominantly loaded with alkaline earth ions, wherein the alkaline earth ions are predominantly magnesium ions, and wherein highly acidic and weakly acidic ion-exchange materials are combined in the chamber of the cartridge,
wherein the first part of the ion-exchange material is loaded with the hydrogen ions to at least 50% of its capacity.

9. A cartridge for treating drinking water, comprising:
at least one chamber including an ion-exchange material,
a first part of which is provided in form of a highly acidic ion-exchange material and in its delivered state predominantly loaded with alkaline earth ions, wherein the alkaline earth ions are predominantly magnesium ions, and a second part of which is provided in form of a weakly acidic ion-exchange material and in its delivered state predominately loaded with hydrogen ions, wherein the highly acidic and the weakly acidic ion-exchange materials are combined in the chamber of the cartridge;

wherein the first and second parts of the ion-exchange material comprise ion-exchange non-woven fabrics.

10. A method for treating drinking water using a cartridge for treating drinking water, the cartridge having at least one chamber including an ion-exchange material, a first part of which is provided in form of a highly acidic ion-exchange material and in its delivered state predominantly loaded with alkaline earth ions, wherein the alkaline earth ions are predominantly magnesium ions, and a second part of which is provided in form of a weakly acidic ion-exchange material and in its delivered state predominately loaded with hydrogen ions, wherein the highly acidic and the weakly acidic ion-exchange materials are combined in the chamber of the cartridge, the method comprising:

passing the drinking water through an ion-exchange material which comprises a mixture of a highly acidic ion-exchange material and a weakly acidic ion-exchange material, wherein one of the highly acidic ion-exchange material or the weakly acidic ion-exchange material is at least partially loaded with alkaline earth ions, wherein the alkaline earth ions are predominantly magnesium ions, wherein the weakly acidic ion-exchange material is loaded with hydrogen ions, and wherein the drinking water is acidified to a pH of not less than 4.2.

* * * * *